Sept. 11, 1928. Re. 17,082
K. R. SCHUSTER
ART OF MIXING CONCRETE AND TRANSPORTING THE SAME
Original Filed April 4, 1916
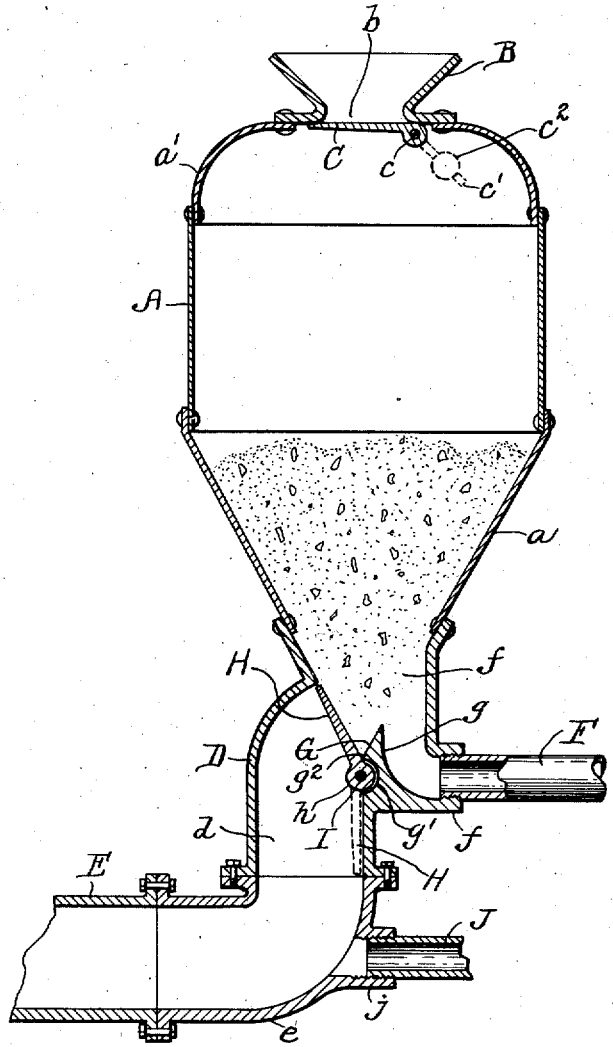
INVENTOR
Karl R. Schuster
BY
H. J. Bernhard
ATTORNEY Reissued Sept. 11, 1928. Re. 17,082

UNITED STATES PATENT OFFICE.

KARL R. SCHUSTER, OF HOPATCONG, NEW JERSEY.

ART OF MIXING CONCRETE AND TRANSPORTING THE SAME.

Original No. 1,553,476, dated September 15, 1925, Serial No. 88,770, filed April 4, 1916. Application for reissue filed December 23, 1926. Serial No. 156,747.

This invention pertains to the art of mixing concrete and transporting the same to the place where said material is to be utilized in the installation of concrete structures of one form or another.

The objects of the invention are to expedite the mixture of the materials, to attain a superior admixture within a few minutes time, and to feed or transport the material from the mixing contrivance, all of which results in substantial economy of the operations.

To these ends, the first part of my invention involves the use of air or other gas under pressure and controlled in such a way as to effect both the admixture of the materials and the feeding or transportation of the resulting concrete. Accordingly, the operations include the depositing of the material (sand, a mineral aggregate and cement with sufficient water) within a closed chamber; admitting air, steam or other gas to the lower part of such chamber, whereby the air or gas blown into the chamber exerts pressure upon the materials so as to blow the same upwardly within the chamber and thereby agitate said materials to secure the desired admixture thereof; then accumulating the air or gas within said chamber until the air or gas pressure upon the mixed materials is equal substantially to the pressure of the current blown into the bottom part of said chamber; then shutting off the pressure of the inflowing air or gas while retaining the pressure within the chamber; then opening the outlet from the bottom of the chamber so as to supplement the gravity or weight of the mass by the pressure of air or gas within the chamber, thereby displacing the mass of materials from said chamber and expelling or feeding said mass through a conduit leading to the point at which the concrete is to be utilized, and, if required, admitting additional air or gas under pressure into the conduit and in the rear of the mass moving through said conduit.

The apparatus invented by me for carrying out the process hereinbefore stated embodies a drum-like chamber provided at its upper portion with a charging opening, and at its lower portion with an outlet; means for closing said charging opening tightly; a pressure pipe attached to the lower part of said chamber for feeding air or gas thereinto and under a pressure sufficient to effect the admixture of the materials and the displacement of the resulting mixed mass of concrete; and a valve for closing the outlet at the time the air or gas is blown into the chamber. From the bottom of the chamber a conduit extends to the point at which the concrete is to be utilized, and if necessary a second pressure pipe is connected with said conduit for blowing air or gas into the same to supplement the pressure of the gas or air admitted initially and thereby effect the movement of the mass of concrete should it be found necessary to transport the latter for a long distance.

Other features and advantages of the invention will appear from the following description taken in connection with the drawing, wherein the figure shown is a vertical section through an apparatus for mixing and transporting concrete in accordance with this invention.

A designates a tank or hopper, the lower part *a* of which is of inverted conical form, whereas the upper part *a'* is dome-shaped. The tank is provided with a mouth member B of flaring form having a charging opening *b*, the latter being normally closed by a gate-valve C. The mouth and the valve are mutually constructed to secure a tight joint around the charging opening in order to preclude the escape of air or gas and to effect the accumulation of the air or gas blown into the chamber of the tank. Any suitable means may be employed for the operation of the gate-valve and to retain the latter in a tightly closed relation to the charging mouth, but, as shown herein, said gate-valve is hung on a rockshaft *c*, to one end of which is attached an externally positioned lever *c'* having a weight $c^2$. The lever provides convenient means for opening the valve in order to introduce the materials into the tank, but when the lever is released, the weight $c^2$ presses the valve tightly against the mouthpiece B.

Attached to the lower part of the tapering member *a* is a fitting D, the same providing an outlet *d* leading from the lower part of the tank or receptacle to an elbow *e* of a conduit E, the latter extending from the tank or receptacle to the place where the mass of concrete is to be used in the construction of buildings, etc. The fitting D is provided at one side thereof with a nipple *f* from which extends a passage *f'* leading upwardly within the fitting and opening into the chamber of the tank or receptacle A. The pressure pipe F is coupled in a suitable way to the nipple *f*, said pipe being adapted to feed air or gas under pressure through the passage $f'$ in a manner to direct the inflowing pressure of air or gas upwardly into the material present within the tank, said inflowing air or gas being directly upwardly into contact with the material and flowing into the mixing chamber above the mixture outlet $d$. The area of the air inlet is considerably less than the area of the outlet $d$ for the mixture; furthermore, the area of the air inlet is less than the area of the mixture inlet $b$; in practice, the mixture outlet is sufficiently large to provide for the free egress of the concrete material, including the coarse mineral aggregate which is incorporated with the sand and cement. The mixture outlet thus affords an unobstructed opening for the mixed material, and the gas or air is supplied under pressure and at the required velocity upwardly into the chamber, and flows through the passage $f'$ and upwardly into the mixing chamber and above the mixture outlet, for agitating the materials to properly effect the mixture thereof. The pressure pipe F should, obviously, be connected with a pressure reservoir into which air or gas is forced by any suitable compressor so as to maintain a pressure of 80 lbs., more or less, as may be found necessary in the operation of the apparatus. The fitting D is, desirably, provided, also, with a baffle G, positioned opposite the outlet of pressure pipe F. The baffle extends upwardly into the space or chamber of fitting D, one surface $g$ of the baffle being curved as shown for the purpose of directing the inflowing air or gas in an upward path into the tank. The baffle G is formed with a recess $g'$ adapted to produce a shoulder $g^2$, and within this recess is fitted a heel $h$ of a valve H, the latter being normally positioned across the outlet from the bottom of the hopper. Said heel of the valve is attached to a rockshaft I, the end portions of which are supported in suitable bearings provided in the fitting D, and, as will be readily understood, this rockshaft is provided with suitable means whereby the shaft may be rocked either by hand or power so as to impart a swinging movement to the valve H. In the operation of mixing the material and of accumulating air or gas pressure within the tank, valve H occupies the raised position shown in full lines in the drawings so as to cut off the outflow of the mass of material and to retain the air or gas within the tank, but after the mixture of the materials shall have been effected within the tank, the rockshaft I is turned so as to move the valve H into the position shown in dotted lines in the drawing. The outlet from the hopper is thus opened for the material to pass through the fitting D and elbow $e$ into the conduit E, the valve H being positioned below the shoulder $g^2$ of the baffle and said valve lying close against a wall of the fitting D so that said valve is substantially out of the path or line of direction of flow of the material as it is forced out of the tank and into the conduit.

It is apparent that the fitting D should be attached firmly to the member $a$ of the tank and to a flange of the elbow $e$, the latter being in turn secured rigidily to the conduit E, but as the details of construction are well within the scope of the skilled constructor, I have not considered it important to more particularly illustrate or describe the special form of connection between the several parts of the apparatus.

The conduit E is of a length to extend from the mixing tank to the place at which the concrete material is to be utilized in construction work, and in some instances this conduit may be so long that the pressure of air or gas accumulated within the tank A is not sufficient to effect the transportation of said concrete material for the full length of said conduit. Under these and other circumstances, it is preferred to employ an additional pressure pipe J, which is coupled to a nipple $j$ of the elbow $e$, whereby said pipe J is adapted to supply additional air or gas to the conduit E and rearwardly of the mass of material moving therein.

The operation is as follows:—

The pressure pipes F, J, are closed by the operation of suitable stop cocks (not shown), and lever $c'$ is operated to open valve C, the valve H occupying the closed position shown in full lines. The materials, usually sand, cement, a mineral aggregate, and water in the required volumes, are poured through the opening $b$ of the charging mouth so as to accumulate within the tank A, and within the passage $f'$, a batch of the materials to be mixed. The valve C is closed, if required, and is pressed tightly against the charging opening of the mouth B, and air or gas under pressure, of about 80 lbs. to the square inch, is admitted to the lower part of the tank through the pipe F. The baffle G directs the inflowing air or gas upwardly and into and through the material comprising the batch, whereby said air or gas when initially admitted blows the material upwardly within the chamber of the tank for the purpose of effecting the admixture of said materials. The air or gas accumulates within the upper part of the tank A and above the mass of materials therein. The air or gas continues to flow into the tank until the pressure in the upper chamber thereof becomes equal to the pressure of the inflowing air or gas, and at this time the mass of material is in a quiescent or non-agitated condition. By accumulating the air or gas within the tank until it has attained a pressure in the upper part of the tank equal to the pressure of the inflowing air gas, instead of permitting the air or gas to escape out of the tank as in systems which have preceded my invention, I am enabled to utilize the air or gas pressure in the expulsion of the mixed mass of materials from the tank and to transport said mixed materials through the conduit to the point where the concrete mixture is to be utilized, as a result of which economy of operation is obtained. The materials having been mixed within the tank, and air or gas having accumulated to about 80 lbs. within said tank and above the mass of materials, the operator should turn rock shaft I in order to move the valve H to the depending position close to a wall of the fitting D, as shown in dotted lines, thus opening the outlet from the tank to the conduit. The weight or gravity of the mass of material, and the pressure of the air or gas upon the mass, effects a quick expulsion of the material from the tank, said material being forced through the conduit E by the pressure of the air or gas. Should the movement of the material be relatively slow, or should the material require transportation for a comparatively long distance, then additional air is supplied directly into the conduit E by the pressure pipe J.

My invention secures important functions in the method of and apparatus for mixing and transporting concrete by blowing compressed air or gas into the materials and into the mixture, whereby the admixture of such materials and the transportation of such mixture are effected pneumatically, for which purpose there is employed a vessel provided at its lower part with a mixture outlet independent of the compressed air inlet and the area of which exceeds the area of said compressed air inlet, and which mixture outlet is controlled by a valve adapted to be closed during the inflow upwardly of the compressed air for agitating and mixing the materials and which valve is opened for the outflow of the mixture, at which stage of the operations compressed air is blown into the mixture as it passes from the mixing vessel and into an off-bearing conduit.

As stated, the fluid pressure supply functions in a two-fold capacity in connection with a mixing vessel provided at its bottom part with a mixture outlet and with a valve for controlling such outlet at the mixing stage of the operations, one function of such fluid pressure supply being to blow compressed air or gas upwardly within the mixing chamber and into the materials to be mixed, the discharge valve being closed at said mixing stage for precluding the outflow of the materials, and another function being to blow compressed air into the mixture as it passes from the mixing vessel and into the conduit, the discharge valve being open at the discharging stage. The discharge valve at the bottom part of the mixing chamber opens a path for the outflow of the mixed materials by gravity, and such outflow is desirably accelerated by pressure upon the mixed mass of air accumulated within the mixing chamber during the upflow of such air through the materials at the mixing stage. Such pressure of air upon the mass tends to dislodge such mass from the chamber, and in the outflow of such mass from the chamber the compressed air flows with the material from the chamber into the offbearing conduit. Again, the compressed air blown into the mixture as the latter passes out of the chamber and into the offbearing conduit, accelerates the discharge of the mixture and acts on the components of such mixture to further agitate such components and to thus improve the mix.

The discharge valve H in one position is inclined for closing the mixture outlet, as shown by full lines, and in a second position, indicated by dotted lines, said valve is out of line of flow of the mixture as it passes from the mixing chamber to the offbearing conduit. In the first (closed) position of said discharge valve, it is inclined relatively to the vertical axis of the mixing chamber and to the compressed air inlet afforded by pipe F, and said valve when in said inclined position, fulfills the further function of means for directing inflowing fluid pressure, admitted by pipe F, upwardly into the mixing chamber, should any part of such inflowing fluid pressure pass by deflector G.

The area of the discharge opening, controlled by valve H, is greater than the area of the blast inlet afforded by pipe F, said discharge opening being relatively large, as shown, to provide for the unobstructed or free outflow of concrete when the valve H is opened, but it is to be noted that during the mixing stage within vessel A, said valve H is closed for precluding the outflow of the components of the mass of concrete to be mixed within the vessel.

I attach importance to the use of the tank closed against the exit of air or gas and the outlet of the materials during the operation of blowing air or gas under pressure into the tank, for the reason that I am thereby enabled to effect substantial economy in the mixing operation and in the subsequent transporting operation. By closing the tank against the egress of air or gas while mixing the ingredients, it is apparent that the cement, introduced in a dry condition, is not blown out of said tank when the air or gas blast is turned on, thus effecting a material saving in the cement; and, further, the air or gas is retained under pressure so that after the blast is first turned on the materials are mixed, and then become quiescent under the accumulated pressure, whereupon valve H is opened and all the mixed mass is expelled by the accumulated pressure, thus effecting a substantial saving in the blast required to effect the mixing and in the pressure utilized for transporting the mass.

In the operation of the apparatus so as to carry out the process of this invention, the inflow of air or gas, at the initial stage of mixing, operates to displace the ingredients of the mixture; but after a short time the mixture attains a state of quiescence, due to the continued inflow of the air or gas and to the accumulation thereof within the upper part of the closed chamber. The air or gas, after the mixing is completed, continues to flow into the chamber until the pressure therein above the mixture is equal to the pressure at the feed pipe or substantially so, this condition being indicated to the user of the apparatus by the cessation of flow from the feed pipe into the chamber or tank, or such indication may obviously be attained by any means known to those skilled in the art, such, for example, as are afforded by a pressure gage or gages.

Having thus fully described the invention, what I claim as new and desire to secure by Letters Patent is:

1. In the art of mixing and transporting concrete, the process which consists in accumulating the materials to be mixed within a closed chamber; blowing air or gas upwardly into contact with said materials for agitating and mixing the same and simultaneously with said inflow of air or gas restraining the materials to preclude their exit from the chamber and restraining, also, the exit from said chamber of the inflowing air or gas; continuing the inflow of air or gas upwardly through the material until it attains a desired pressure upon the mixed mass; releasing the mixed mass from restraint and expelling the same from said chamber solely by the pressure of air or gas accumulated therein, and by a continuance of said inflow of gas and moving the mixed mass to a place of use by air or gas pressure applied to said mass.

2. In the art of mixing and transporting concrete, the process which consists in accumulating the materials to be mixed within a closed chamber; blowing air or gas under pressure upwardly within said chamber into contact with said materials for agitating and mixing the same and simultaneously therewith restraining the exit from said chamber of the agitated materials and of the inflowing air or gas; continuing to feed air or gas under pressure upwardly into the mass and the chamber until such air or gas attains a desired pressure within said chamber; releasing the mixed mass from restraint and expelling said mass from the chamber solely by the pressure of air or gas accumulated therein; and subjecting the mixed mass to the pressure of the air or gas released from the chamber augmented by the pressure of additional air or gas supplied rearwardly of the moving mixed mass.

3. In an apparatus of the class described, the combination of a chamber provided with a charging opening and at its bottom portion with an outlet, means for closing the charging opening against the escape of air or gas, means connected with said chamber for blowing air or gas therein, a valve operable to close the outlet during the operation of blowing air or gas into the chamber, a baffle positioned intermediate the valve and the outlet from said blowing means, for directing the inflowing air or gas upwardly within the chamber, and a conduit connected to the bottom part of the chamber for the flow of the concrete mass therethrough upon opening the valve.

4. In an apparatus of the class described, the combination of a closed chamber provided with a charging opening, an off-bearing conduit connected to the bottom portion of said chamber and affording an outlet for the mass therein, means for closing said charging opening whereby air or gas is precluded from escaping out of the chamber, a valve positioned for cutting off communication between the chamber and the off-bearing conduit, means connected with said chamber for feeding air or gas upwardly into said chamber when said valve is closed, said valve being operable to open a path from the chamber to the conduit and thereby utilize the pressure of the accumulated air or gas in displacing the mixture, and means for feeding air or gas into said conduit and rearwardly of the material moving through it.

5. An apparatus for mixing concrete and the like embodying a vessel provided at its upper part with a charging opening, said vessel having at the lower part an outlet for the mixture, means for insuring the inflow of air in an upward direction into the mixture and above the mixture outlet, the area of said mixture outlet exceeding the area of the air inlet and affording an unobstructed path for the free egress of the mixed materials, and a valve for closing the mixture outlet at the mixing stage of the operation.

6. An apparatus for mixing concrete and the like, comprising a vessel provided with an upper feed opening, a compressed air nozzle at the lower part thereof having a fluid discharge opening of smaller area than the said upper opening, a movably-mounted valve at the lower part of the vessel, and an upwardly directed baffle interposed in the path of the air from said nozzle, said baffle being independent of the said valve.

7. An apparatus for mixing and transporting concrete and the like, comprising a vessel provided with an opening at the top, a conduit adapted for communication with the lower part of said vessel, means for admitting fluid under pressure to the lower part of said vessel and the conduit, and a member at the lower part of said vessel opposite to the fluid pressure inlet to said vessel, having a surface constructed to receive the impact of the fluid and to divert such fluid upwardly into the vessel.

8. An apparatus for mixing and transporting concrete and the like, comprising a vessel having an opening at its upper part and a valve controlled discharge opening in its lower part, a discharge conduit communicating with said vessel through said opening in its lower part, means for feeding fluid under pressure to the conduit and to the vessel in proximity to the discharge opening in said vessel, and means for directing said fluid upwardly into said vessel when the said discharge opening is closed, said fluid feeding means being arranged to discharge fluid into the materials passing into said discharge conduit when the lower opening is opened.

9. An apparatus for mixing concrete and the like, comprising a vessel provided with an upper opening, means for feeding fluid under pressure into the lower part of said vessel, a conduit connected with the lower part of the vessel and affording means for the outflow of the mixture from said vessel, and a valve at the lower part of said vessel adjacent the inlet for the fluid pressure, said valve having an upwardly inclined surface adjacent said fluid inlet.

10. An apparatus for mixing concrete and the like comprising a vessel provided with an upper charging opening and a lower discharging opening for the aggregates to be mixed, an off-bearing conduit connected for receiving the mixed aggregates from said discharging opening, fluid pressure means connected for communication with said vessel and said conduit and operable for feeding fluid under pressure into the aggregates for mixing the same and for feeding fluid into the mixed aggregates at the stage of the outflow thereof through said discharging opening, and a valve positioned adjacent the discharging opening for closing it during the mixing stage and operable to open an exit for the outflow of the mixed aggregates into the conduit.

11. The herein described method of agitating concrete or the like in a vessel and discharging it therefrom which consists in placing the concrete in the vessel, injecting compressed air thereinto upwardly from the bottom thereof, then permitting the concrete to pass in a stream like condition from the said vessel and simultaneously with such outflow injecting at the lower part of said vessel compressed air into the stream of the outflowing concrete, the direction of flow of the air so injected being in the same general direction as the stream like flow of the concrete.

12. The herein described method of agitating concrete or the like in a vessel and discharging and conveying it therefrom which consists in placing the materials in the vessel, injecting compressed air thereinto from the lower part thereof, discharging from the lower part of the vessel the mixed materials, and concurrently with such discharge injecting at the lower part of said vessel compressed air into the outflowing material for accelerating such discharge.

13. In the art of mixing concrete or the like within a vessel and discharging it therefrom, the process which consists in placing the concrete within the vessel, blowing compressed air upwardly into the concrete present within the vessel for agitating and mixing the concrete, opening an outlet from the vessel, dislodging the mixture through said outlet by the air pressure within the vessel and by blowing compressed air into the concrete at substantially the point where said concrete flows out of said vessel.

14. In the art of mixing concrete or the like within a vessel and discharging it therefrom, the process which consists in placing concrete within the vessel, blowing compressed air upwardly within the vessel and into the concrete for mixing the same, discharging the mixed concrete in a stream like condition and by gravity from said vessel, and concurrently with such gravity outflow dislodging the concrete by air pressure within the vessel and blowing air into the stream of flowing concrete emerging from said vessel.

15. In the art of mixing and discharging concrete, the process which consists in placing the concrete within a vessel, blowing compressed air upwardly within the vessel and into the concrete for agitating and mixing the same, discharging the mixed concrete from the bottom of said vessel and into a conduit, and blowing compressed air into the concrete substantially at the place where said concrete flows out of the vessel and as it moves within said conduit.

16. In the art of mixing and discharging concrete, the process which consists in placing concrete within a mixing vessel, discharging the mixed concrete from said vessel and into a conduit, and blowing compressed air into said vessel at one stage and into the conduit at the subsequent stage during the outflow of said concrete from the vessel for effecting the admixture of concrete within the vessel at the first stage and for effecting the transportation of the mixture within the conduit at the subsequent stage of the operations.

17. In an apparatus for mixing and transporting concrete, a mixing vessel provided with upper and lower openings, a valve for closing said lower opening, a conduit for receiving mixed concrete through said valved opening, means for blowing compressed air into the concrete within the vessel when said valve is closed, whereby the concrete is agitated and mixed within the vessel, and means for blowing compressed air into the concrete when said valve is opened, whereby the concrete is discharged into and propelled within said conduit.

18. In an apparatus for mixing and discharging concrete, a mixing vessel provided with an upper opening and a lower opening, a conduit for receiving concrete through said lower opening, a valve for closing said lower opening, and means connected with the lower part of said vessel and with said conduit for blowing compressed air into the concrete present within said vessel and into the concrete flowing from said vessel into said conduit, whereby the concrete is mixed within the vessel when the valve is closed and the outflow of the mixed concrete, when the valve is opened, is accelerated by compressed air blown directly into the outflowing concrete at a level below the area at which the mixture is effected within the vessel.

19. In an apparatus for mixing and discharging concrete, a vessel, a conduit connected to the lower part thereof, a valve for opening and closing the communication between the vessel and the conduit, means separate from the conduit for blowing compressed air upwardly within said vessel for effecting the admixture of the concrete when the valve is closed, and separate means for blowing compressed air into concrete flowing from said vessel and into said conduit when said valve is opened, for propelling the mixed concrete within said conduit.

20. In the art of mixing and transporting concrete, the process which consists in mixing concrete within a vessel by blowing compressed air into the concrete present within the vessel, discharging the mixed concrete from the vessel in a path separate from the path of inflow of the compressed air into said vessel; and accelerating the outflow of the mixed concrete by blowing compressed air into and within the outflowing mixture and substantially in the direction of movement of such outflowing mixture.

21. In the art of mixing and transporting concrete, the process which consists in mixing concrete within a vessel by blowing compressed air into the concrete present within a vessel, discharging the mixed concrete in a stream like condition from the vessel, and accelerating the outflow of the concrete by blowing compressed air into the stream like mixture substantially at the stage of its outflow from said vessel.

22. In an apparatus for mixing and discharging concrete, a mixing vessel provided with an upper charging opening and a lower discharging opening, a conduit for receiving concrete through said discharging opening, a valve operable for arresting the outflow of concrete through said discharging opening during the mixing stage of the concrete, and means for blowing compressed air into the concrete present within the mixing vessel and blowing compressed air into the outflowing concrete at a level below the area within the vessel at which the admixture is effected thereon, whereby in the closed position of said valve the concrete is mixed by the inflow of compressed air and thereafter the outflow of the mixed concrete is accelerated by the compressed air blown into such outflowing concrete.

23. In an apparatus for mixing and discharging concrete, a mixing vessel provided with an upper charging opening and a lower discharging opening, a conduit for receiving concrete through said discharging opening, a valve operable for arresting the outflow of concrete through said discharging opening during the mixing stage of the concrete, and means for blowing compressed air into said mixing vessel at the mixing stage and for blowing compressed air into the outflowing concrete at a level below the zone at which the admixture of the aggregates is effected within said vessel, whereby the concrete is mixed within the vessel by the inflowing compressed air and the outflow of the concrete is accelerated by compressed air blown into the concrete at the outflowing stage thereof.

24. In the art of mixing and transporting concrete, the process which consists in placing the aggregates within a vessel, blowing compressed air within the vessel and into the aggregates for effecting the admixture thereof, discharging the mixed aggregates from the vessel, and accelerating the discharge by blowing compressed air into the outflowing aggregates below the level at which the admixture is effected within said vessel.

In testimony whereof I have hereto signed my name this 22nd day of December, 1926.

KARL R. SCHUSTER.